United States Patent
Cheng

(10) Patent No.: US 8,250,358 B2
(45) Date of Patent: Aug. 21, 2012

(54) DATA DIODE SYSTEM

(75) Inventor: Kelvin Y. Cheng, Brea, CA (US)

(73) Assignee: Raytheon Company, Waltham, MA (US)

(*) Notice: Subject to any disclaimer, the term of this patent is extended or adjusted under 35 U.S.C. 154(b) by 793 days.

(21) Appl. No.: 12/416,831

(22) Filed: Apr. 1, 2009

(65) Prior Publication Data

US 2010/0257353 A1 Oct. 7, 2010

(51) Int. Cl.
*G06F 1/26* (2006.01)
*G06F 1/00* (2006.01)
*H02M 3/335* (2006.01)
*H02M 7/42* (2006.01)

(52) U.S. Cl. ......... 713/153; 363/17; 363/19; 363/21.01; 363/108; 713/310; 713/340; 726/36

(58) Field of Classification Search ................... None
See application file for complete search history.

(56) References Cited

U.S. PATENT DOCUMENTS

| | | | |
|---|---|---|---|
| 5,959,849 A * | 9/1999 | Batarseh et al. ............... 363/16 |
| 6,108,787 A * | 8/2000 | Anderson et al. ................ 726/5 |
| 7,941,828 B2 * | 5/2011 | Jauer .............................. 726/4 |
| 2002/0112181 A1 * | 8/2002 | Smith .......................... 713/201 |
| 2005/0033990 A1 * | 2/2005 | Harvey et al. ................ 713/201 |

* cited by examiner

*Primary Examiner* — Nasser Goodarzi
*Assistant Examiner* — Fatoumata Traore
(74) *Attorney, Agent, or Firm* — Schwegman, Lundberg & Woessner, P.A.

(57) ABSTRACT

A data diode system enables one-way data flow from an unsecured device to a secured device is disclosed. The data diode system includes at least one data diode that convert a communication received from an unsecured device to a secured communication for transmission to the secured device. The data diode system includes a voltage converter that receives a negative voltage from a serial data port connection of the secured device. The voltage converter converts the negative voltage into a positive voltage in order to power the data diode.

23 Claims, 4 Drawing Sheets

DATA DIODE SYSTEM

FIELD

This document relates to a data diode system, and more particularly to powering a data diode system.

BACKGROUND

Advances in communication technology have made it easier to communicate information between computer systems and/or devices connected to different communication networks. When transferring information between different networks it is often important that the transfer of information occurs in a secure manner. In some computing and communication environments that include multiple networks, such information security can be obtained by physically isolating each individual network. For example, secured networks or devices used by the United States Department of Defense are typically physically isolated from all other unsecured networks.

However, in certain work environments, it may be necessary for a secured network to collect data from an unsecured network. For example, in a defense environment, it may be necessary to have a computer system or device used in a secured network that can receive information from an unsecured network. There are also commercial applications where companies dealing with sensitive information may require one or more computers in their network to be connected to an unsecured network or the Internet.

Data diodes have been used to provide information security when transferring information between an unsecured network and a secured network. The data diode can be connected between different networks and will only allow data to travel in one direction. For example, the secured network can receive data from the unsecured network via a data diode, but the unsecured network cannot receive data from the secured network.

Data diodes typically require an external voltage source to operate. Unfortunately, it may be impossible or inconvenient to obtain power from external voltage source under certain conditions.

SUMMARY

According to one aspect, a data diode system transfers a communication from an unsecured network to a secured network. The system includes a DC converter that receives a negative DC voltage from a serial data connection of the secured network and inverts the negative DC voltage to a positive voltage. A data diode circuit receives the positive DC power from the DC converter, receives the communication from the unsecured network, and, in response, generates a secured communication and transmits the secured communication to the secured network.

According to another aspect, a data diode system transfers a communication from an unsecured communication device to a secured communication device. The system includes a DC converter that receives the communication from a data port of the unsecured communication device. The data port includes a first data transmit connection, a first ground connection, and a first data receive connection. The DC converter inverts the negative DC voltage into a positive DC voltage. A data diode circuit receives the positive DC voltage from the DC converter, receives the communication from the unsecured communication device, and, in response, generates a secured communication. The data diode circuit then transmits the secured communication to the secured communication device.

According to another aspect, a method is provided for transferring a communication from an unsecured network to a secured network. The method includes receiving the communication at a data diode system from the unsecured network. The data diode system includes a DC converter and a data diode circuit. The method also includes receiving a negative DC voltage at the DC converter through a serial data connection of the secured network and converting the negative DC voltage to a positive DC power at the DC converter. The method further includes receiving the positive DC voltage at the data diode circuit and generating a secured communication at the data diode circuit in response to the communication and the received positive DC voltage and transmitting the secured communication to the secured network.

Additional objectives, advantages and novel features will be set forth in the description which follows or will become apparent to those skilled in the art upon examination of the drawings and detailed description which follows.

BRIEF DESCRIPTION OF THE DRAWINGS

Corresponding reference characters indicate corresponding elements among the view of the drawings. The headings used in the figures should not be interpreted to limit the scope of the claims.

DETAILED DESCRIPTION

Aspects of the data diode system described herein enable secured communication between an unsecured communication network and a secured communication network via a data diode system without the need for an external power source. According to one aspect, the data diode system receives power from a secured device connected to the secured network. However, the power provided from the secured device is a negative voltage. The data diode system includes a voltage converter to convert the negative voltage into a positive DC voltage to operate the data diode system.

Figure 1A:
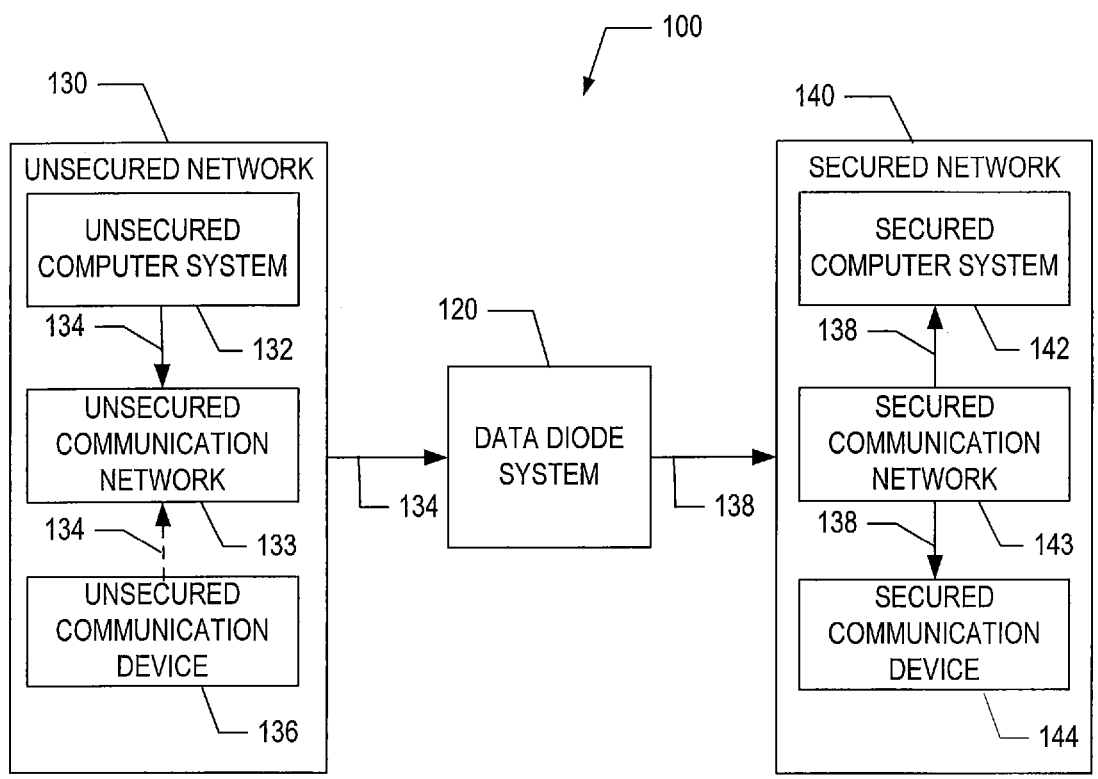
FIG. 1A is a simplified block diagram illustrating the data diode system.

Referring to the drawings, an exemplary embodiment of a data communication system is illustrated and generally indicated as 100 in FIG. 1A. The data communication system 100 includes a data diode system 120, an unsecured network 130, and a secured network 140.

According to one aspect, the unsecured network 130 may include an unsecured computer system 132 that is connected to an unsecured communication network 133, such as an unsecured local area network (LAN), an unsecured wide area network (WAN), or the Internet. The unsecured computer system 132 is, for example, a computer server or other computer system capable of generating a communication signal ("communication") 134 for transmission to one or more devices or other networks. The communication 134 can include audio data, image data, video data, text data, and other data that can be communicated between computer devices or networks.

According to another aspect, the unsecured network 130 may include an unsecured communication device 136 that is connected to the unsecured computer system 132 via the unsecured communication network 133. The unsecured communication device 136 is, for example, a portable radio or other mobile communication device that is capable of generating the communication 134. The unsecured computer system 132 receives the communication 134 from the unsecured communication device 136 and transmits the communication 134 to one or more other networks.

In one aspect, the data diode system 120 permits one-way or uni-directional data communication between the unsecured network 130 and the secured network 140. In particular, the data diode system 120 permits the secured network 140 to receive data from the unsecured network 130 and prohibits the transmission of data from the secured network 140 to the unsecured network 130. The data diode system 120 receives the communication 134 from the unsecured network 130 and generates a secured communication 138 in response thereto. The secured communication 138 includes the same data as the communication 134, but can only be received by the secured network 140.

The secured network 140 may include a secured computer system 142 that is connected to a secured communication network 143. The secured computer system 142 is, for example, a computer server or other computer system that receives the secured communication 138 from the data diode system 120.

According to another aspect, the secured communication network 140 may include a secured communication device 144 that is connected to the secured computer system 142 via the secured communication network 143. The secured communication device 144 is, for example, a portable radio or other portable communication device capable of receiving the secured communication 138 from the data diode system 120 and/or from the secured computer system 142.

The unsecured and secured networks 130, 140 may each comprise a modulator (not shown) or other communication system that modulates communications for transmission and that demodulates the received communications for reception by the data diode system.

Figure 1B:
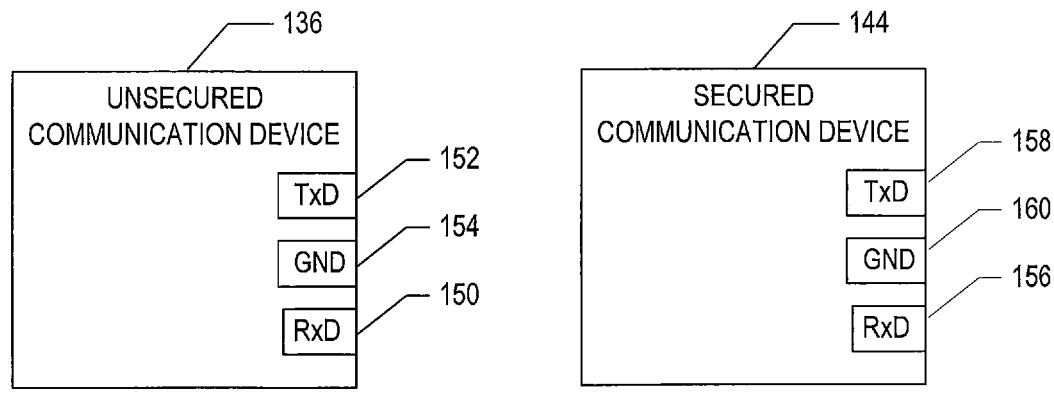
FIG. 1B is a simplified block diagram illustrating serial data connections of communication devices.

As shown in FIG. 1B, each of the unsecured and secured communication devices 136, 144 may include one or more data ports that each includes data connections for facilitating the transfer and reception of the communication 134 and secured communication 138, respectively. For example, the unsecured communication device 136 includes a data receive (RxD) connection 150, a data transmit (TxD) connection 152, and a ground (GND) connection 154. Similarly, the secured communication device 144 includes an RxD connection 156, a TxD connection 158, and a GND connection 160. The RxD connections 150, 156 are, for example, serial Recommended Standard (RS) 232 data stream inputs. The TxD connections 152, 158 are, for example, serial RS232 data stream outputs.

The data diode system 120 requires both positive and negative DC voltage sources to isolate and regenerate the communication transmitted from an unsecured network 130 or an unsecured device 136. Most network devices rely on integrated modem status lines (not shown) to provide the required positive and negative voltages, however many portable devices, such as radios, have only a data port that includes three terminal connections (e.g., TxD, RxD, and GND connections). However, none of these connections provides a positive voltage source necessary to power the data diode system 120. The present data diode system 120 generates the required positive voltage from the TxD connection 158, which normally stays negative.

Figure 2:
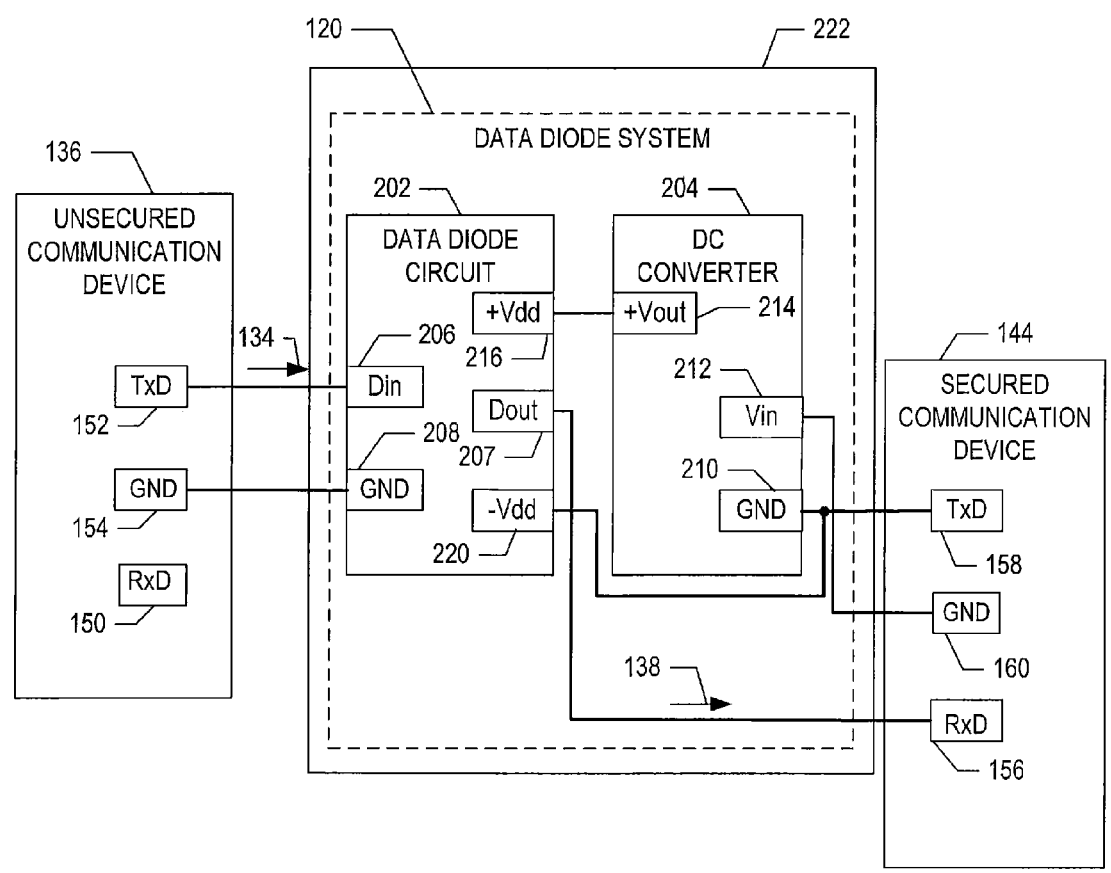
FIG. 2 is a simplified block diagram illustrating the data diode system in a data communication system.

FIG. 2 is a block diagram of the data diode system 120 according to one aspect of the data communication system 100. The data diode system 120 includes a data diode circuit 202 and a direct current (DC)-to-DC voltage converter (DC converter) 204.

The data diode circuit 202 receives the communication 134 at a data in ($D_{in}$) connection 206 from the TxD connection 152 of the unsecured communication device 136. A GND connection 208 of the data diode circuit 202 is linked to the GND connection 154 of the unsecured communication device 136. The RxD connection 150 of the unsecured communication device 136 does not require a connection. When powered, the data diode circuit 202 generates the secured communication 138 at a data out ($D_{out}$) connection 207 in response to receiving the communication The data diode system 120 is configured to receive the positive (e.g., $+V_{DD}$) and negative ($-V_{DD}$) DC voltages to operate the data diode circuit 202 from the secured communication device 144. According to one aspect, the DC converter 204 converts a negative voltage supplied from the secured communication device 144 to the positive voltage. For example, as described above, the TxD connection 158 of the secured communication device 144 normally provides a negative DC voltage. The TxD connection 158 of the secured communication device 144 is connected to a GND connection 210 of the DC converter 204. The GND connection 160 of the secured communication device 144 is connected to a voltage input ($V_{in}$) connection 212 of the DC converter 204. As a result, the $V_{in}$ connection 212 is at a ground potential of the secured communication device 144. As a result, the DC converter 204 generates a voltage with the same magnitude as the TxD connection 158 but with an inverted polarity (i.e., $+V_{dd}$) at a positive voltage output ($+V_{out}$) connection 214. For example, the TxD connection 158 of a Raytheon® Rifleman or a Land Warrior System radio may provide a negative voltage ($-V_{dd}$) that ranges between $-5V$ to $-15V$. Accordingly, the DC converter 204 can be used to generate a positive DC voltage that ranges from 5V to 15V. The generated positive voltage may then be applied to a positive voltage input ($+V_{dd}$) connection 216 to power the data diode circuit 202.

Thus, the present data diode system 120 enables a positive voltage to be generated from the transmit data line (e.g., TxD connection 158), which is normally negative and which cannot be programmed to stay positive all the time. A voltage converter normally requires a positive input to either provide an output of 2× input voltage (voltage doubler) or a 1× input voltage but of negative polarity (converter). This data diode system 120 reconfigures a voltage doubler to provide 1× positive voltage from a negative voltage input.

According to one aspect, the data diode system 120 is located near the secured communication device 144. For example, the data diode system 120 is housed in a lightweight enclosure 222 that can be attached and/or fitted to the secured communication device 144 or a user of the secured communication device 144.

Figure 3:
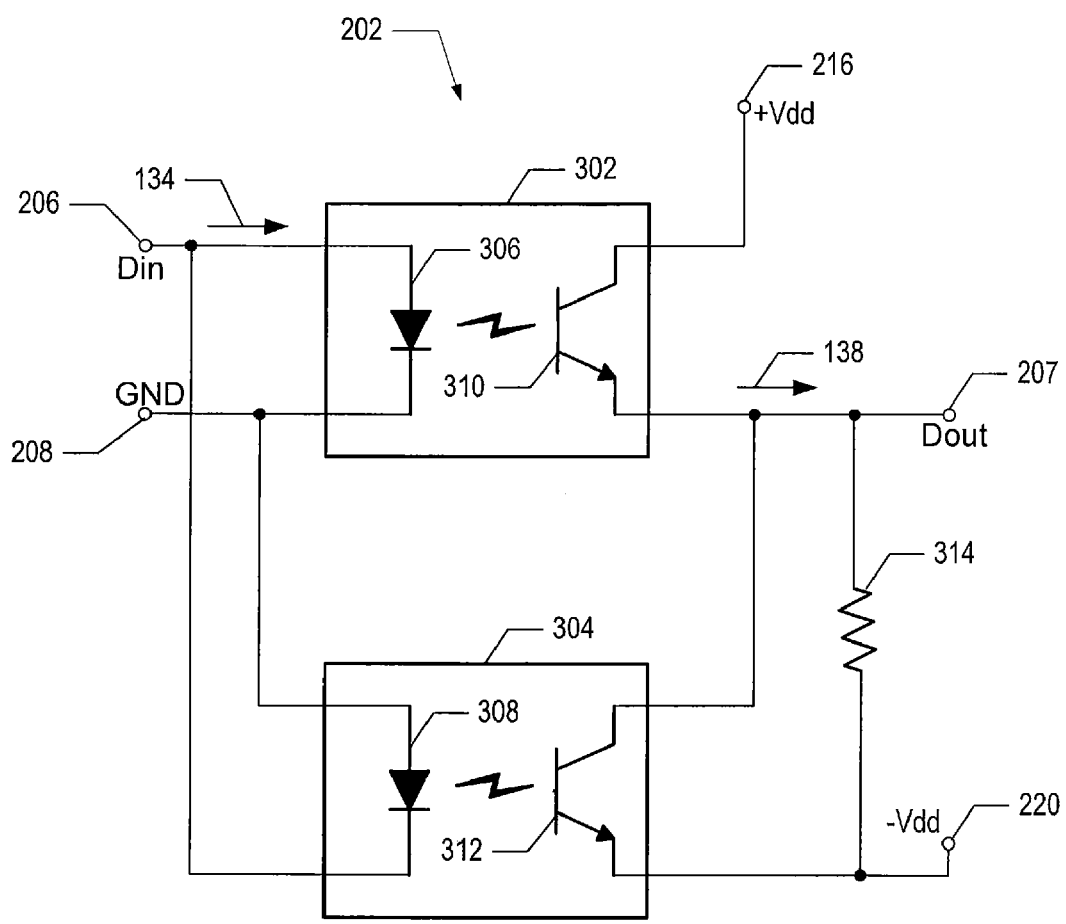
FIG. 3 is a circuit schematic of a data diode circuit.

FIG. 3 illustrates an exemplary embodiment of the data diode circuit 202 shown in FIG. 2. The data diode circuit 202 includes two opto-isolators 302, 304. The opto-isolators 302, 304 include a light-emitting diode (LED) 306, 308, respectively, that generate light in response to the received communication 134.

The opto-isolators 302, 304 also include phototransistors 310, 312. Each of phototransistors 310, 312 receives generated light through an optically transparent barrier that passes light, but not electric current. When voltage is applied to the phototransistors 310, 312 and the LEDs 306, 308 are generating light, the phototransistors 310, 312 generate the secured communication 138 at the $D_{out}$ connection 207.

In operation, the $D_{in}$ connection 206 of the opto-isolator 302 is connected through a current limiting resistor (not shown in the diagram) to the TxD connection 152 of the unsecured communication device 136 to receive the communication 134. The communication 134 is, for example, an electrical signal that is representative of the communication generated at the unsecured communication device 136. The ground (GND) connection 208 of the opto-isolator 302 receives a connection from the GND connection 154 of the unsecured network 136. The anode of the LED 306 of the opto-isolator 302 corresponds to the $D_{in}$ connection 206 and the cathode of the LED 306 corresponds to the GND connection 208. The LED 306 generates an optical signal (e.g., light) in response to the communication 134 when the TxD connection 152 of the unsecured communication device 136 is at a positive potential (e.g., positive voltage) with respect to GND connection 208 (or GND connection 154). The phototransistor 310 converts the optical signal into the secured communication 138 when a positive voltage is applied to a $+V_{dd}$ connection 216 of the opto-isolator 302.

Opto-isolator 304 operates in the same manner as the opto-isolator 302. As can be seen from FIG. 3, the anode of the LED 308 of the opto-isolator 308 corresponds to the GND connection 208 and the cathode of the LED 306 corresponds to the $D_{in}$ connection 206. The LED 308 generates an optical signal (e.g., light) in response to the communication 134 when the TxD connection 152 of the unsecured communication device 136 is at a negative potential (e.g., negative voltage) with respect to GND connection 208 (or GND connection 154). Also, the phototransistor 312 converts the optical signal into the secured communication 138 when a negative voltage is applied to a $-V_{dd}$ connection 220 of the opto-isolator 304.

According to another aspect, a voltage-maintenance resistor 314 can be connected between the $D_{out}$ connection 207 and the $-V_{dd}$ connection 220 to prevent the serial data port of the secured device 144 from entering a stand-by mode or shutting down. For example, the serial data port may go into stand-by or even shut down mode when the RxD connection 156 of the secured device 144 is electrically at ground potential 160. This may occur, for example, when the serial cable of the source device (e.g. unsecured communication device 136) is disconnected from the data diode system 120. Even when the TxD connection 152 of the unsecured device 136 is reconnected, an RxD connection 156 of the secured device 144 that previously shutdown or entered a stand-by mode will not be able to return to normal function. Instead, power must be cycled to the secured device 144 in order to return the system to normal operation. The incorporation of the resistor 314 into the data diode circuit 202 will maintain the negative voltage at the RxD connection 156, thereby preventing the serial data port of the secured device 144 from entering stand-by mode or shutting down.

In certain embodiments, the maintenance resistor 314 may be rather large, thereby providing a resistance on the order of 100 kΩ. The benefits of keeping the destination serial port 144 powered, after disconnecting the source device from the data diode 120, will be appreciated by those skilled in the art.

Figure 4:
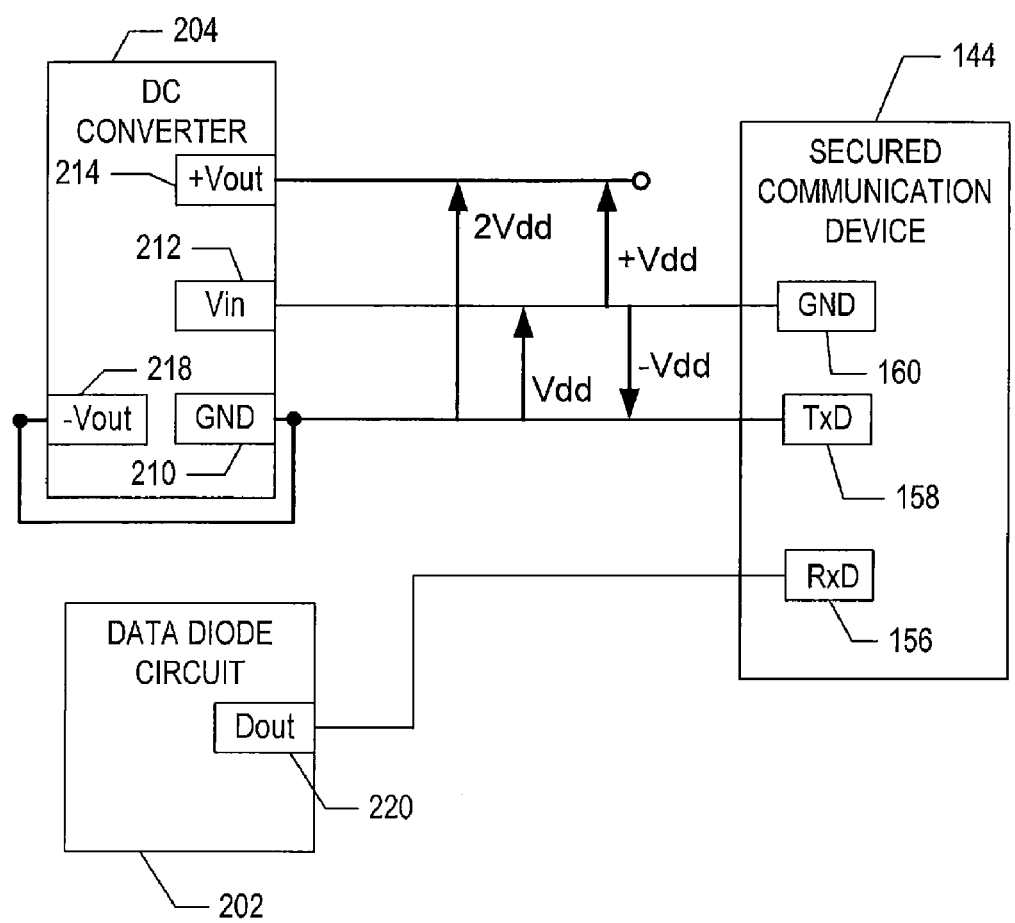
FIG. 4 illustrates voltage potentials between a DC converter and a communications device with respect to their corresponding ground connections.

FIG. 4 shows the voltage potential between the $+V_{out}$ connection 214 and the GND connection 210 and between the $V_{in}$ connection 212 and the GND connection 210 of the DC converter 204. The voltage potential between the $+V_{out}$ connection 214 and the GND connection 160 and between the $V_{in}$ connection 212 and the GND connection 160 of the secured communication device 144 is also shown. The $V_{in}$ of the DC converter 204 will see a positive voltage of $+V_{dd}$ with respect to the GND connection 210 of the DC converter 204. The $+V_{out}$ connection 214 of the DC converter 204 will provide double the voltage seen at the $V_{in}$, i.e. 2 $V_{dd}$.

As the secured device 144 references voltages to GND connection 160, the $V_{out}$ of the converter as seen by the destination device will be $+V_{dd}$. The destination transmit data (TxD) will also be used to provide the negative voltage of $-V_{dd}$.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A data diode system for transferring a communication from an unsecured network to a secured network, the system comprising:
    a DC converter configured to receive a negative DC voltage from a serial data connection of the secured network and to convert the negative DC voltage to a positive DC voltage;
    a data diode circuit configured to:
        receive the positive DC voltage from the DC converter to power the data diode circuit;
        receive a communication from the unsecured network;
        generate a secured communication in response to the communication; and
        transmit the secured communication to the secured network.

2. The system of claim 1 wherein:
    the unsecured network comprises an unsecured communication device connected to an unsecured communication network; and
    the secured network comprises a secured communication device connected to a secured communication network;
    wherein the communication is generated at the unsecured communication device and transmitted to the data diode circuit via the unsecured communication network; and
    wherein the secured communication is transmitted to the secured communication device via the unsecured communication network.

3. The system of claim 2 wherein:
    the unsecured communication device comprises a first data transmit connection, a first ground connection, and a first data receive connection; and
    the secured communication device comprises a second data transmit connection, a second ground connection, and a second data receive connection;
    wherein the communication is transmitted from the first data transmit connection to the data diode circuit; and
    wherein the secured communication is transmitted from the data diode circuit to the second data receive connection.

4. The system of claim 3 wherein the DC converter receives the negative DC voltage from the second data transmit connection.

5. The system of claim 3 wherein the DC converter is further configured to transmit the negative DC voltage and wherein the data diode circuit comprises:

a first opto-coupler configured to:
  receive the communication from the first data transmit connection;
  receive the positive DC voltage from the DC converter; and
  generate the secured communication in response to the communication and the positive DC voltage when the first data connection is at a negative voltage in reference to the first ground connection; and
a second opto-coupler configured to:
  receive the communication from the first data transmit connection;
  receive the negative DC voltage from the second data transmit connection; and
  generate the secured communication in response to the communication and the negative DC voltage when the first data connection is at a negative voltage in reference to the first ground connection.

6. The system of claim 5 wherein the DC converter comprises a third ground connection, a voltage input connection, a positive voltage output connection, and wherein:
  the third ground connection is connected to the second data transmit connection;
  the voltage input connection is connected to the second ground connection; and
  the positive voltage output connection is connected to a positive voltage input of the first opto-coupler.

7. The system of claim 5 further comprising a resistor connected between the second data transmit connection and the second ground connection, wherein the resistor maintains the negative DC voltage at the second data receive connection when the unsecured device is disconnected from the data diode system.

8. The system of claim 7 wherein the resistor has a resistance between to 90 to 110 kilo-ohms.

9. The system of claim 1 wherein the data diode circuit and the DC converter are housed in an enclosure that is configured to be attached or fitted to a user of the secured communication device.

10. A data diode system for transferring a communication from an unsecured communication device to a secured communication device, the system comprising:
a DC converter configured to:
  receive a negative DC voltage from a serial connection of the secured communication device; and
  convert the negative DC voltage into a positive DC voltage;
a data diode circuit configured to:
  receive the positive DC voltage from the DC converter to power the data diode circuit;
  receive the communication from a data port of the unsecured communication device, the data port comprising a first data transmit connection, a first ground connection, and a first data receive connection;
  generate a secured communication in response to the communication and the received positive DC voltage; and
  transmit the secured communication to the secured communication device.

11. The system of claim 10 wherein:
the secured communication device comprises a second data transmit connection, a second ground connection, and a second data receive connection;
wherein the communication is transmitted from the first data transmit connection to the data diode circuit; and
wherein the secured communication is transmitted from the data diode circuit to the second data receive connection.

12. The system of claim 11 wherein the DC converter receives the negative DC voltage from the second data transmit connection.

13. The system of claim 11 wherein the DC converter is further configured to transmit the negative DC voltage and wherein the data diode circuit comprises:
a first opto-coupler configured to:
  receive the communication from the first data transmit connection;
  receive the positive DC voltage from the DC converter; and
  generate the secured communication in response to the communication and the positive DC voltage when the first data connection is at a positive voltage in reference to the first ground connection; and
a second opto-coupler configured to:
  receive the communication from the first data transmit connection;
  receive the negative DC voltage from the second transmit connection; and
  generate the secured communication in response to the communication and the negative DC voltage when the first data connection is at a positive voltage in reference to the first ground connection.

14. The system of claim 13 wherein the DC converter comprises a third ground connection, a voltage input connection, and a positive voltage output connection, and wherein:
  the third ground connection is connected to the second data transmit connection;
  the voltage input connection is connected to the second ground connection;
  the positive voltage output connection is connected to a positive voltage input of the first opto-coupler; and
  the second data transmit connection is connected to a negative voltage input of the first opto-coupler.

15. The system of claim 13 further comprising:
a resistor connected between the second data transmit connection and the second ground connection;
wherein the resistor maintains the negative DC voltage at the second data receive connection when the unsecured device is disconnected from the data diode system; and
wherein the resistor has a resistance between to 90 to 110 kilo-ohms.

16. The system of claim 10 wherein the data diode circuit and the DC converter are housed in an enclosure that is configured to be attached or fitted to a user of the secured communication device.

17. A method for transferring a communication from an unsecured network to a secured network comprising:
  receiving a communication at a data diode system from the unsecured network, the data diode system comprising a DC converter and a data diode circuit;
  receiving a negative DC voltage at the DC converter from a serial data connection of the secured network;
  converting the negative DC voltage to a positive DC voltage at the DC converter;
  receiving the positive DC voltage at the data diode circuit;
  generating a secured communication at the data diode circuit in response to the communication and the received positive DC voltage; and
  transmitting the secured communication to the secured network.

18. The method of claim 17 wherein:

the unsecured network comprises an unsecured communication device connected to an unsecured communication network; and the secured network comprises a secured communication device connected to a secured communication network; and the method further comprises:

generating the communication at the unsecured communication device;

transmitting the communication to the data diode circuit via the unsecured communication network; and transmitting the secured communication to the secured communication device via the secured communication network.

19. The method of claim 18 wherein:

the unsecured communication device comprises a first data transmit connection, a first ground connection, and a first data receive connection; and the secured communication device comprises a second data transmit connection, a second ground connection, and a second data receive connection; and the method further comprises:

transmitting the communication from the first data transmit connection to the data diode circuit; and transmitting the secured communication from the data diode circuit to the second data receive connection.

20. The method of claim 19 further comprising receiving the negative DC voltage at the DC converter from the second data transmit connection.

21. The method of claim 19 wherein the data diode circuit comprises a first opto-coupler and a second opto-coupler configured; and the method further comprises:

receiving the communication at the first opto-coupler from the first data transmit connection;

receiving the positive DC voltage from the DC converter to power the data circuit;

generating the secured communication in response to the communication and the positive DC voltage when the first data connection is at a positive voltage in reference to the first ground connection;

receiving the communication at the second opto-coupler from the first data transmit connection;

receiving the negative DC voltage from the second transmit data connection;

generating the secured communication in response to the communication and the positive DC voltage when the first data connection is at a negative voltage in reference to the first ground connection; and transmitting the secured communication to the second data receive connection.

22. The method of claim 21 wherein:

the DC converter comprises a third ground connection, a voltage input connection, and a positive voltage output connection, and the method further comprising:

receiving a ground potential at the voltage input connection from the second ground connection;

receiving the negative voltage at the third ground connection from the second data transmit connection; and supplying the positive voltage to a positive voltage input of the first opto-coupler from the positive voltage output connection.

23. The method of claim 17 wherein the data diode circuit and the DC converter are housed in an enclosure and the method further comprises attaching or fitting the enclosure to a user of the secured communication device.

\* \* \* \* \*